(12) United States Patent
Christ et al.

(10) Patent No.: US 6,658,370 B2
(45) Date of Patent: Dec. 2, 2003

(54) ADAPTIVE SERVO MOTOR RETUNING METHOD AND SYSTEM

(75) Inventors: Bernard J. Christ, New Fairfield, CT (US); Egbert E. Most, Southbury, CT (US); Peter K. Zanger, Naugatuok, CT (US)

(73) Assignee: Pitney Bowes Inc., Stamford, CT (US)

( * ) Notice: Subject to any disclaimer, the term of this patent is extended or adjusted under 35 U.S.C. 154(b) by 243 days.

(21) Appl. No.: 09/930,578

(22) Filed: Aug. 15, 2001

(65) Prior Publication Data

US 2003/0036812 A1 Feb. 20, 2003

(51) Int. Cl.⁷ .............................................. G05B 13/00
(52) U.S. Cl. ...................... 702/182; 702/183; 702/184; 702/185; 702/190; 702/191; 702/192
(58) Field of Search ................................. 702/182, 183, 702/184, 185, 187, 188, 189, 190, 191, 192, 193, 194, FOR 134–137, FOR 151, FOR 155–157, FOR 159–160, FOR 162–164, FOR 166, FOR 170–171; 318/432, 567, 162, 569, 609, 434, 610–612, 560, 615, 616, 568.1–568.25, 618, 619, 629, 632, 561, 599; 388/806, 809, 815, 904; 347/8, 19, 106, 37

(56) References Cited

U.S. PATENT DOCUMENTS

| 3,739,158 | A | * | 6/1973 | Woodward | 318/571 |
|---|---|---|---|---|---|
| 4,404,626 | A | * | 9/1983 | Aoyama | 700/69 |
| 5,223,774 | A | * | 6/1993 | Ikeda et al. | 318/268 |
| 5,475,291 | A | * | 12/1995 | Yoshida et al. | 318/568.22 |
| 5,552,691 | A | * | 9/1996 | Pierce et al. | 318/652 |
| 5,684,374 | A | * | 11/1997 | Chaffee | 318/616 |
| 5,691,616 | A | * | 11/1997 | Iwashita | 318/615 |
| 5,821,724 | A | * | 10/1998 | Hinton | 318/798 |
| 5,936,366 | A | * | 8/1999 | Hamamura et al. | 318/560 |
| 5,998,957 | A | * | 12/1999 | Tadmor et al. | 318/701 |
| 6,121,744 | A | * | 9/2000 | Hoda et al. | 318/685 |
| 6,150,777 | A | * | 11/2000 | Lander | 318/245 |
| 6,198,246 | B1 | * | 3/2001 | Yutkowitz | 318/561 |
| 6,232,737 | B1 | * | 5/2001 | Kachi et al. | 318/610 |
| 6,487,458 | B1 | * | 11/2002 | Trapasso | 700/28 |
| 2002/0158598 | A1 | * | 10/2002 | Oka | 318/560 |

* cited by examiner

Primary Examiner—Marc S. Hoff
Assistant Examiner—Carol S. W. Tsai
(74) Attorney, Agent, or Firm—Angelo N. Chacles; Charles R. Malendra, Jr.; Michael J. Cummings

(57) ABSTRACT

A method and system are invented for adaptively and automatically retuning a closed-loop servo motor that is operating within normal limits. A first active set of configurable tuning constants is assigned to the servo motor, and motor performance is periodically measured to determine if performance is outside a retuning threshold, in which case the active set of configurable tuning constants is replaced by selecting a replacement set of tuning constants from a finite group of discrete predesigned sets of tuning constants. Actual performance of the servo motor is remeasured, and this process is repeated if the performance remains outside the retuning threshold. The predesigned sets of tuning constants are derived and stored in the servo motor software, typically as a result of pretesting the servo motor model by the manufacturer, for example using manual retuning.

21 Claims, 2 Drawing Sheets

ADAPTIVE SERVO MOTOR RETUNING METHOD AND SYSTEM

TECHNICAL FIELD

The present invention relates to closed-loop servo motors, and more particularly to a method and system for retuning a closed-loop servo motor.

BACKGROUND OF THE INVENTION

Generally speaking, a servo motor includes a motor, a feedback device, and a drive. The motor operates on direct current, and is typically hotter and smaller than other motors producing a comparable amount of torque. The feedback device is often an encoder or resolver mounted on the back of the motor, and the feedback device reports performance information such as motor position and motor speed back to the drive. The servo motor's drive provides current to the motor, and the drive typically includes a programmable control device (e.g., a controller) which dictates the current in response to the feedback from the feedback device. The most widely used algorithm for servo motor control is the proportional-integral-derivative (PID) algorithm, according to which various programmable filter parameters are used, depending upon the particular application, to determine the current in response to the feedback.

Over time, a servo motor and/or the equipment which it actuates may incur wear and tear, or otherwise be affected by aging, and therefore it is well known that the performance and lifespan of a servo motor can be increased by tuning the servo motor, for example by adjusting the PID filter parameters. Various tuning systems for servo motors have been devised in the past, and those systems often require manual retuning which can be very costly and time-consuming. It is very difficult or impossible for manual retuning to measure performance using actual motor profiles with actual mechanical loading, especially if actual loading is based on paper flow through a system.

Automatic self-tuning methods for electrical motors are also known, the method of Taylor et al. (U.S. Pat. No. 5,834,918) being an example. The automatic, related-art self-tuning methods such as Taylor suffer from implementation complexity. They typically use mathematical modeling in order to anticipate how the motor must be tuned, and therefore use formulas to determine various tuning constants based upon motor measurements, instead of relying upon predesigned sets of tuning constants determined in a laboratory. The related art thus is unnecessarily complex and time-consuming, and furthermore fails to take advantage of measurement and diagnostic equipment available in the laboratory of the manufacturer or distributor.

SUMMARY OF THE INVENTION

The primary objective of this invention is to provide a servo motor tuning method appropriate for a specific type of motor application, such as paper handling or processing. Because the application is known in advance, it is possible to use laboratory testing in order to determine how a specific type of servo motor will behave over its lifetime, and to determine by manual retuning how that servo motor model will have to be automatically retuned. The present invention therefore dispenses with complex mathematical modeling installed in the servo motor tuning software, and instead takes advantage of laboratory testing on a particular type of servo motor. This method has the further advantage that diagnostic equipment available to the manufacturer can be used to test and tune the servo motor, whereas such equipment would not ordinarily be available to end users. The present invention efficiently measures performance using actual motor profiles with actual mechanical loading, for example with actual loading based on paper flow through a system, in order to produce data which is then inserted into the programming for the servo motor retuning software.

Accordingly, the present invention includes a method for adaptively retuning a closed-loop servo motor that is operating within normal limits, in order to automatically retune the servo motor and thereby improve performance of the servo motor. The method comprises the sequential steps of: assigning a first active set of configurable tuning constants to the servo motor in order to operate the servo motor, periodically measuring actual performance of the servo motor while the servo motor is operating within the normal limits, determining if the actual performance of the servo motor differs from a servo motor specification performance by an amount representing a performance deficit that is outside a retuning threshold but within the normal limits for the servo motor, maintaining the active set of configurable tuning constants if the performance deficit is within the retuning threshold, and deactivating the active set of configurable tuning constants and activating a replacement active set of configurable tuning constants for the servo motor if the performance deficit exceeds the retuning threshold but is within the normal limits. According to this method, all sets of configurable tuning constants are selected from a finite group of discrete predesigned sets of tuning constants, and the replacement active set of configurable tuning constants is incrementally different from the active set which it replaced. Actual performance of the servo motor is remeasured, and this process is repeated if the performance deficit remains outside the retuning threshold but within the normal limits.

This method is implemented by a combination of hardware and software, and the predesigned sets of tuning constants will have been derived and stored in response to laboratory testing of the servo motor. This laboratory testing will typically be performed in a laboratory, workshop, or office of the manufacturer or distributor of the servo motor or the equipment which will be operated by the servo motor. Furthermore, the predesigned sets of tuning constants are derived not just in response to laboratory testing of the servo motor, but also in response to testing of the particular type of equipment operated by the servo motor, and that equipment is substantially the same as the equipment which will be operated by the servo motor when the servo motor is ultimately used by the end user. The predesigned sets of tuning constants may advantageously include programmable filter parameters of the PID algorithm.

The present invention may be less useful to servo motor manufacturers who have no way of knowing the precise type of application to which the motor will be put, and therefore accurate laboratory simulations will not be an ideal way of determining the tuning constants. However, for a manufacturer of a particular type of equipment (e.g., paper processing equipment) in which servo motors are installed, the present invention can be an efficient way of predetermining the sets of tuning constants that will be successively employed after this type of equipment is sold to an end user.

BEST MODE FOR CARRYING OUT THE INVENTION

Figure 1:
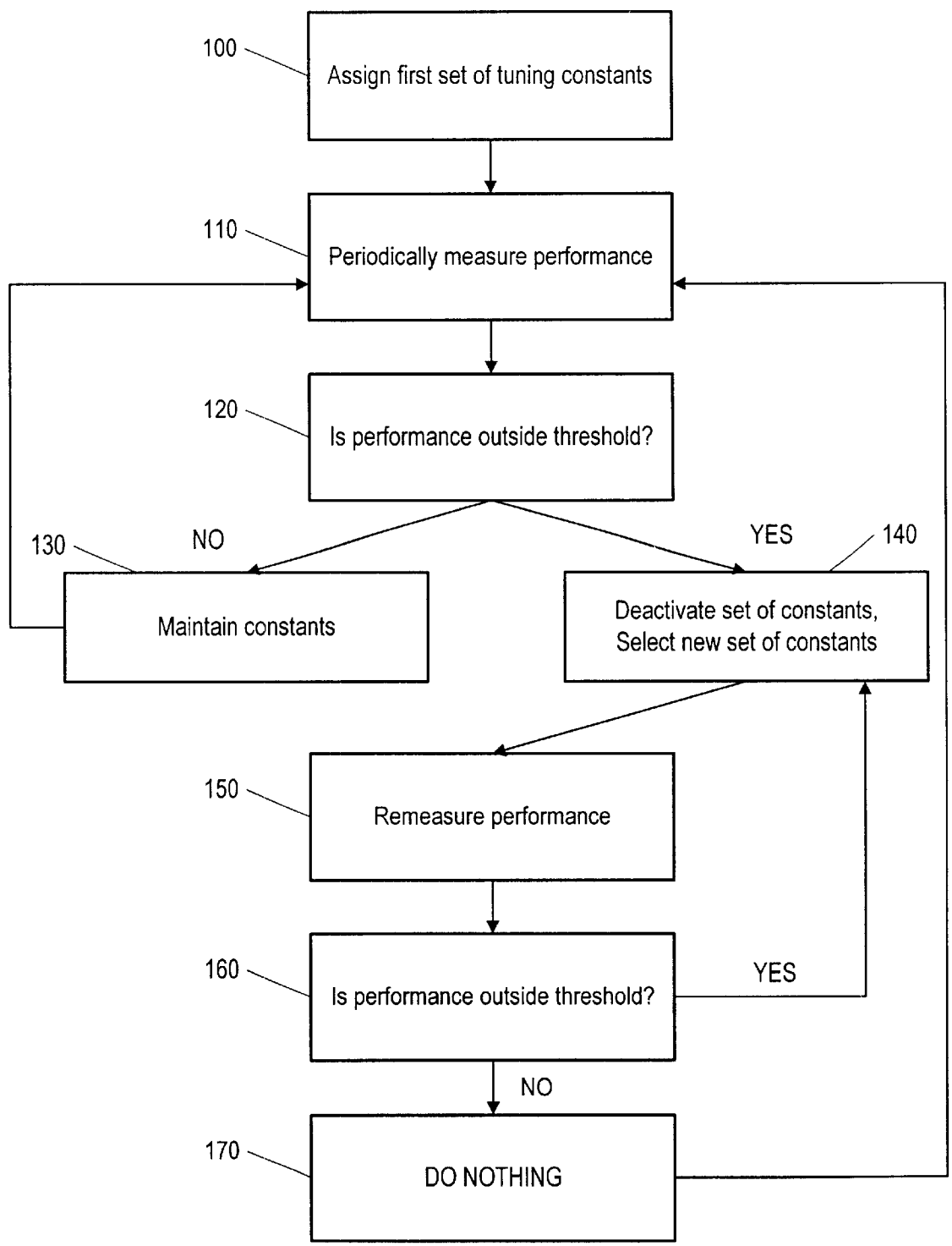
FIG. 1 is a flow chart illustrating a method according to the present invention.

According to a best mode embodiment of the present invention, as seen in FIG. 1, a first set of active tuning constants is assigned 100 to the servo motor. Then servo motor performance is periodically measured 110, and the question 120 is addressed as to whether the performance is outside a threshold level. If the performance is not outside the threshold level, then the set of tuning constants is maintained 130. However, if the performance is outside the threshold level, then the active set of tuning constants is deactivated and a new set of tuning constants is selected and activated 140 if available. Then performance is remeasured 110, and again the question 120 is addressed as to whether the performance is within the threshold; if so then nothing is done, but if the performance is outside the threshold then steps are repeated beginning with deactivation 140 of a set of constants.

The step of assigning 100 a first active set of configurable tuning constants to the servo motor is necessary in order to operate the servo motor, and this step may be performed whenever the servo motor is powered up. Those skilled in the art will realize that this first set of tuning constants may advantageously be the same as the tuning constants that were active when the servo motor was last powered up. Periodically measuring 110 actual performance of the servo motor is done while the servo motor is operating within normal limits. In other words, the present method is for tuning the servo motor, and not for repairing a malfunctioning servo motor. Subsequently, it is determined 120 if the servo motor is functioning optimally, and this is done by assessing whether the actual performance of the servo motor differs from a servo motor specification performance by an amount representing a performance deficit that is outside a retuning threshold but within the normal limits for the servo motor. Of course, as indicated above, if the performance deficit is within the retuning threshold then the active set of configurable tuning constants is maintained 130. However, if the performance deficit exceeds the retuning threshold but is within the normal limits, then the active set of configurable tuning constants is deactivated and a replacement active set of configurable tuning constants for the servo motor is activated 140.

According to this embodiment, all sets of configurable tuning constants are selected from a finite group of discrete predesigned sets of tuning constants, and the replacement active set of configurable tuning constants is incrementally different from the active set which it replaced. After the selection 140 of the replacement constants, actual performance of the servo motor is remeasured 150 and if the performance deficit remains outside the retuning threshold but within the normal limits 160, ten steps are repeated beginning with deactivating 140 the set of replacement constants and selecting a new set. If remeasured performance is within the returning threshold, then no action is required 170 and periodic measurement 110 resumes. The present method is implemented by a combination of hardware and software, and the predesigned sets of tuning constants are typically derived and stored in response to laboratory testing of the servo motor.

As discussed previously, the present invention is particularly advantageous in a situation where the entity programming the servo software (e.g. the servo motor manufacturer) knows what types of application the servo motor will be used for. This makes accurate laboratory testing possible. For instance, if a servo motor has a specified function within an Advanced Productivity System (APS) Inserter System, then the servo motor can be laboratory-tested in that context in order to determine the predesigned sets of configurable tuning constants that will be installed in the servo motor software for later sequential use. These predesigned sets of constants will automatically compensate for mechanical variations of the motor load due to wear or frictional changes that occur over the life of the controlled mechanism, or over the life of the servo motor itself, or due to variations in processed material (e.g. changes in paper thickness). By periodically measuring motor performance, and determining if performance is out of specification, it is then possible to automatically change the current set of motor filter constants to a new set. Repetition of this process is possible for as many sets of criteria as are available to be used. Laboratory testing ensures that each data set (i.e. each set of configurable tuning constants) is limited to provide only tuning data that will provide safe operation that is not harmful to the motor, amplifier, or mechanism. The data sets may be generated manually in laboratory bench tests, using any motor tuning techniques that are already in place, and development of the data sets in a laboratory setting may also employ automatic tuning techniques. This method will require motor control equipment that provides access to commanded and actual encoder positions, and access to configurable tuning constants. The invention uses the actual motor profiles with the actual mechanical loading to measure performance.

As those skilled in the art will understand, the finite group of discrete predesigned sets of tuning constants can be expressed by a table. For example, each column of the table can represent one set, and each row can represent a particular type of tuning constant (e.g. integral gain). There is thus a tuning table for each servo motor. If two different servo motors are an identical model of servo motor, they still may be assigned different tuning tables depending upon whether they perform different functions or the same function.

Periodically measuring performance 110 may be accomplished by measuring an absolute error which is the absolute value of desired position minus actual position taken during a configurable sample time period. The absolute value may be averaged over the sample time period, so as to provide immunity to noise while eliminating unnecessary updates. Again, it should be emphasized that measuring performance 110 should only be done if the motor is operating normally within normal limits (i.e., without stalling or reaching an error limit condition). When the absolute error reaches the magnitude of the threshold in the active table entry, then the next table entry becomes the active table entry, and new filter constants are applied to the motor. This process keeps occurring until the table is exhausted (e.g. until the active column is the last column), at which time it may be necessary to replace the motor, motor controller, amplifier, or some other part of the servo motor or of the equipment which the servo motor actuates. When the problem has been corrected, the user may reset the active table column back to the first column, and the entire method would start over. According to this embodiment, a tuning table and active table entry number for each motor are kept on permanent media and loaded each time the machine is powered on.

According to this best mode embodiment of the present invention, each set of configurable tuning constants includes at least two parameters selected from a collection consisting of proportional gain, integral gain, derivative gain, acceleration feed forward, velocity feed forward, and friction feed forward. These are standard filter parameters of the PID algorithm discussed above. Proportional gain affects analog command voltage or pulse rate based on the amount of position error. Integral gain is used to integrate static error and fine tune the position at rest. Derivative gain affects the analog command voltage or pulse rate based on the amount of position error change occurring in the last two samples. Acceleration feed forward is used to add extra output during acceleration to reduce following error. Velocity feed forward is used to add extra output during constant velocity to reduce following error. Friction feed forward is used to add extra output during any commanded velocity to reduce following error caused by friction.

In addition to the configurable tuning constants, the retuning threshold may also be configurable, and thus be susceptible to being changed whenever the tuning constants are changed. However, the retuning threshold may also be permanently fixed, in which case it would not have to be included in the retuning table.

Although the present invention would be suitable for a brush motor, the best embodiment will instead involve a brushless DC motor, because a brushless DC motor does not require a conductor that maintains an electric connection between stationary and moving parts. Also, a preferred embodiment can include a last set of tuning constants for which the retuning threshold substantially corresponds to the normal operating limit, so that the tuning table will not be exhausted until the servo motor reaches the point of malfunctioning or functioning unacceptably. Furthermore, in the a preferred embodiment, the group of discrete predesigned sets of tuning constants forms a linear progression of pre-designed sets which are activated in a sequential order, one after the other; however, it is certainly instead possible that a predesigned set or sets could be skipped if a periodical measurement reveals that the retuning threshold has been exceeded by an unexpectedly large amount. These periodical measurements may occur weekly, for example, and it could be that the servo motor is operated much more during some weeks than other weeks, in which case it may be appropriate to skip at least one data set in the retuning table.

Similarly, it will sometimes be advantageous for at least one of the discrete predesigned sets of tuning constants to contain a subgroup of discrete predesigned subsets of tuning constants, so as to facilitate a series of substeps substantially the same as the steps already discussed. For example, although a servo motor will be affected by long-term gradual changes due to wear and tear of equipment over the course of weeks and months, the servo motor may also be impacted by predictable effects of continuous unremitting usage, for example during the course of a day. In that case, it is useful to perform a subroutine that retunes the servo motor during the course of a day (or the course of the continuous usage), without affecting the performance of the long-term retuning process of the present invention. Thus, after the servo motor is finally shut down, it will later be powered up while being assigned the same column from the tuning table that it was assigned when previously shut down, although that column could have a variety of different subsets of tuning constants including a first set which would be assigned when the servo motor is powered up. Whenever the servo motor is replaced or is manually retuned, the preferred embodiment can require that the tuning constants be reset to the first active set, which essentially returns the entire process to square one.

Figure 2:
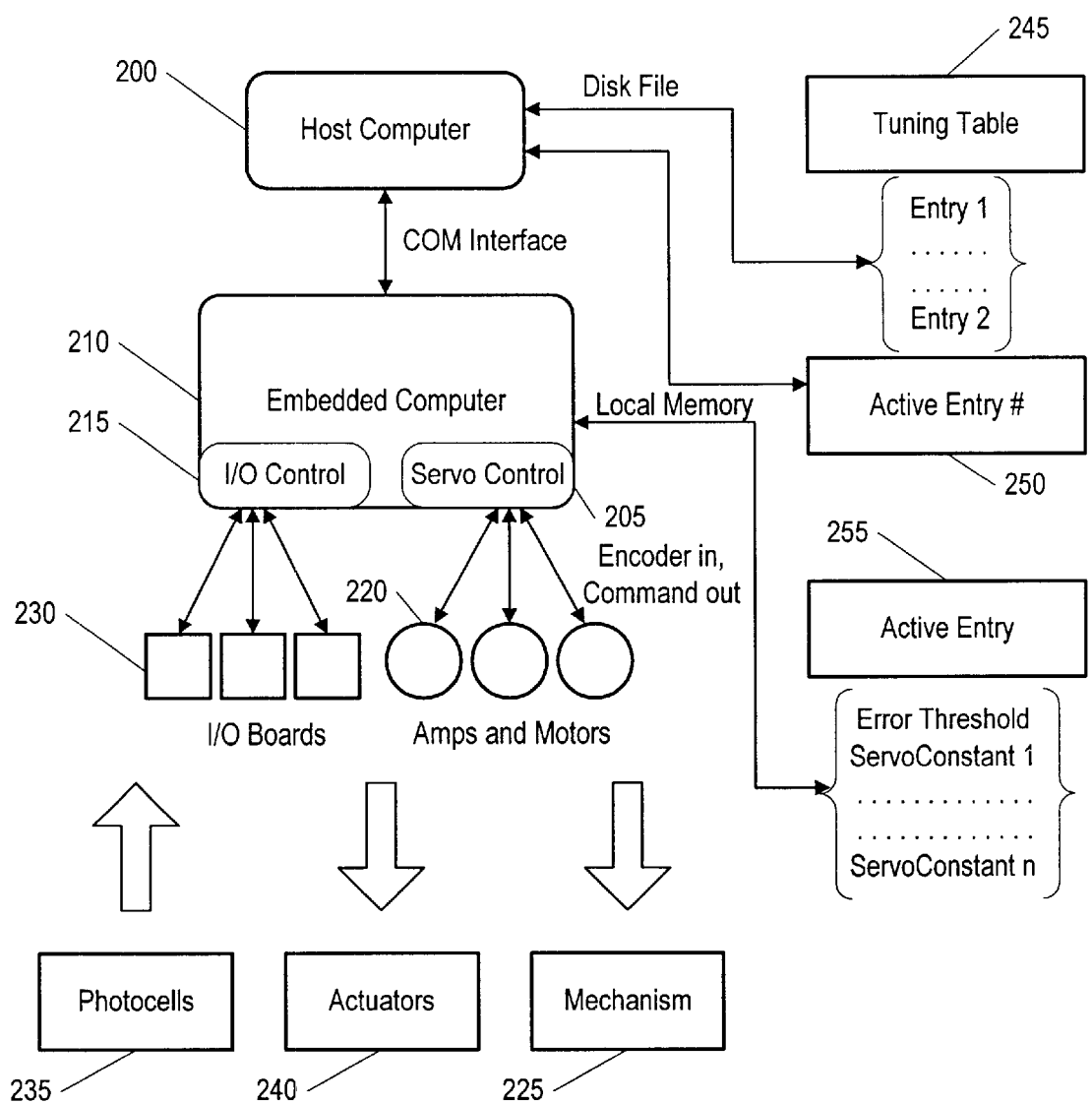
FIG. 2 illustrates a system in which a servo motor may be tuned according to the present invention.

As best seen in FIG. 2, a preferred embodiment of the present invention can be implemented using a system comprising a host computer 200 which may be hosting a plurality of servo motors. A particular servo motor 220 actuates a particular piece of equipment or mechanism 225. For each servo motor 220, the host computer maintains a tuning table 245 (e.g. on a disk file) which includes a plurality of sets of entries, only one entry 250 being active at any particular time; in other words, only one column of the table representing one set of configurable tuning constants will be active at a particular time. The active entry 250 is assigned by the host computer to an embedded computer 210 which is local relative to the servo motor 220 and connected to the host computer 200 via a communication (COM) interface, and thus the active entry 255 will be copied from the host computer's tuning table for the particular servo motor 220 being tuned; the active entry 255 may be stored in a local memory of the embedded computer 210. The servo motor 220 includes an encoder which is operatively connected to the motor so as to periodically report actual performance of the motor. Also, the embedded computer 210 includes a servo control device 205, responsive to the report from the encoder, and programmed to determine and inform the host computer 200 if the servo motor has an actual performance which differs from a servo motor specification performance by an amount representing a performance deficit that is outside a retuning threshold.

The host computer 200 is programmed to instruct the servo control device 205 to deactivate the active set 255 of configurable tuning constants and activate a replacement active set 250 of configurable tuning constants for the servo motor 220 if the performance deficit exceeds the retuning threshold. All sets of configurable tuning constants are selected by the host computer 200 from a finite group 245 of discrete predesigned sets of tuning constants stored in the host computer. The replacement active set of configurable tuning constants 250 is incrementally different from the active set 255 which it replaced. The predesigned sets of tuning constants were derived and stored by the host computer 200 in response to laboratory testing of the servo motor.

Also shown in FIG. 2 are other standard elements of a typical servo system, in this case a servo system associated with an Advanced Productivity System (APS) Inserter System, although these other standard elements are not necessary for an understanding of the present invention. For example, the embedded computer 210 comprises an I/O control 215 for input/output control, operatively connected to I/O Boards 230 which are circuit boards for receiving and transferring information between the I/O control 215 and various photocells 235 and actuators 240.

It is important to realize, as those skilled in the art will understand, that the tuning method of the present invention is employed during operation of the servo system by an end user. However, the present invention also comprises a laboratory method which is employed by a manufacturer or distributor of the servo system software, in order to properly program the servo retuning system by determining how the particular type of closed-loop servo motor will be adaptively and automatically tuned when it reaches the end user in the future. This laboratory method involves deriving predesigned sets of tuning constants by periodically testing and manually tuning a motor of the particular type, thereby forming over time a finite sequential group of the predesigned sets of tuning constants. Then software is prepared for controlling the particular type of closed-loop servo motor, by including in the software the group of predesigned sets of tuning constants which will be used to adaptively and automatically retune motors of the particular type tested in the laboratory, when the motors of the particular type are automatically determined to be in need of tuning. Of course, the laboratory testing of the motor is performed not just on the servo motor, but also on the equipment with which the servo motor will interact, because wear and tear on that equipment will be important for determining how the server motor must be tuned.

Certain changes may be made in the above best mode without departing from the scope of the invention, as will be understood by those skilled in the art, and it is intended that all matter contained in the above description or shown in the accompanying drawings shall be interpreted as illustrative and not in a limiting sense. The invention disclosed herein can be implemented by a variety of combinations of hardware and software, and those skilled in the art will understand that those implementations are derivable from the invention as disclosed herein.

What is claimed is:

1. A method for adaptively retuning a closed-loop servo motor that is operating within normal limits, in order to automatically retune the servo motor and thereby improve performance of the servo motor, comprising the sequential steps of:
   (a) assigning a first active set of configurable tuning constants to the servo motor in order to operate the servo motor,
   (b) periodically measuring actual performance of the servo motor while the servo motor is operating within the normal limits,
   (c) determining if the actual performance of the servo motor differs from a servo motor specification performance by an amount representing a performance deficit that is outside a retuning threshold but within the normal limits for the servo motor,
   (d) maintaining the active set of configurable tuning constants if the performance deficit is within the retuning threshold,
   (e) deactivating the active set of configurable tuning constants and activating a replacement active set of configurable tuning constants for the servo motor if the performance deficit exceeds the retuning threshold but is within the normal limits, wherein all sets of configurable tuning constants are selected from a finite group of discrete predesigned sets of tuning constants, and wherein the replacement active set of configurable tuning constants is incrementally different from the active set which it replaced,
   (f) remeasuring actual performance of the servo motor, and
   (g) repeating steps (e) through (g) if the performance deficit remains outside the retuning threshold but within the normal limits.

2. The method of claim 1, wherein the predesigned sets of tuning constants result from testing prior to step (a) of both the servo motor and particular equipment operated by the servo motor.

3. The method of claim 1, wherein the configurable tuning constants include at least two parameters selected from a collection consisting of proportional gain, integral gain, derivative gain, acceleration feed forward, velocity feed forward, and friction feed forward.

4. The method of claim 1, wherein the actual performance is indicated by an encoder or resolver mounted on the servo motor.

5. The method of claim 1, wherein the predesigned sets of tuning constants compensate for effects of aging and usage upon the servo motor and equipment actuated by the server motor, as determined by the laboratory testing.

6. The method of claim 1, wherein the retuning threshold is a configurable constant that changes when step (e) is performed.

7. The method of claim 1, wherein the retuning threshold is permanent, and therefore the retuning threshold remains unchanged when step (e) is performed.

8. The method of claim 1, wherein the servo motor is a brushless direct current motor.

9. The method of claim 1, wherein the servo motor is a brush motor.

10. The method of claim 6, wherein the finite group of discrete predesigned sets of tuning constants has a last set of tuning constants for which the retuning threshold substantially corresponds to the normal operating limit.

11. The method of claim 1, wherein the group of discrete predesigned sets of tuning constants forms a linear progression of predesigned sets which are activated in a sequential order.

12. The method of claim 1, wherein at least one of the discrete predesigned sets of tuning constants contains a subgroup of discrete predesigned subsets of tuning constants, and wherein the subgroup and the subsets of the subgroup are used according to a series of steps substantially the same as the steps of claim 1.

13. The method of claim 12, wherein the discrete predesigned subsets of tuning constants within the subgroup compensate for effects of continuous uninterrupted operation of the servo motor, as determined by the laboratory testing.

14. The method of claim 1, wherein the discrete predesigned sets of tuning constants within the group compensate for effects of continuous uninterrupted operation of the servo motor, as determined by the laboratory testing.

15. The method of claim 13, wherein the active set of configurable tuning constants when the servo motor is powered up remains unchanged from when the servo motor was most recently used, but within the active set there is a first subset of configurable tuning constants that must be used when the servo motor is powered up.

16. The method of claim 1 wherein the actual performance is determined by taking an average over a specified time period that is long enough to provide immunity to noise and avoid unnecessarily performing step (e) of claim 1.

17. The method of claim 1, wherein the tuning constants are reset to the first active set when a servo motor part is replaced or the servo motor is manually retuned.

18. A system for adaptively retuning a closed-loop servo motor that is operating within normal limits, in order to automatically retune the servo motor and thereby improve performance of the servo motor, comprising:
   (a) the servo motor;
   (b) a host computer which stores a first active set of configurable tuning constants for assignment to the servo motor in order to operate the servo motor, wherein the host computer also hosts at least one other motor;
   (c) an encoder operatively connected to the servo motor so as to periodically report actual performance of the servo motor; and
   (d) a servo control device, responsive to the report from the encoder, and programmed to determine and inform the host computer if the servo motor has an actual performance which differs from a servo motor specification performance by an amount representing a performance deficit that is outside a retuning threshold;

wherein the host computer is programmed to instruct the servo control device to deactivate the active set of configurable tuning constants and activate a replacement active set of configurable tuning constants for the servo motor if the performance deficit exceeds the retuning threshold, wherein all sets of configurable tuning constants are selected by the host computer from a finite group of discrete predesigned sets of tuning constants stored in the host computer, and wherein the replacement active set of configurable tuning constants is incrementally different from the active set which it replaced.

19. The system of claim 18, wherein the predesigned sets of tuning constants are derived and stored in the host computer, in response to pretesting another servo motor.

20. A method for adaptively retuning a closed-loop servo motor which is operating within normal limits and which operates paper handling equipment, in order to automatically retune the servo motor and thereby improve performance of the servo motor, comprising the sequential steps of:

(a) assigning a first active set of configurable tuning constants to the servo motor in order to operate the servo motor, (b) periodically measuring actual performance of the servo motor while the servo motor is operating within the normal limits, (c) determining if the actual performance of the servo motor differs from a servo motor specification performance by an amount representing a performance deficit that is outside a retuning threshold but within the normal limits for the servo motor, (d) maintaining the active set of configurable tuning constants if the performance deficit is within the retuning threshold, (e) deactivating the active set of configurable tuning constants and activating a replacement active set of configurable tuning constants for the servo motor if the performance deficit exceeds the retuning threshold but is within the normal limits, wherein all sets of configurable tuning constants are selected from a finite group of discrete predesigned sets of tuning constants, and wherein the replacement active set of configurable tuning constants is incrementally different from the active set which it replaced, (f) remeasuring actual performance of the servo motor, and (g) repeating steps (e) through (g) if the performance deficit remains outside the retuning threshold but within the normal limits.

21. The method of claim 2, wherein the closed loop servo motor is automatically retuned and the testing comprises manual retuning.

* * * * *